United States Patent
Muizelaar et al.

(10) Patent No.: US 9,945,283 B2
(45) Date of Patent: Apr. 17, 2018

(54) MULTIPORT VALVE WITH MODULAR ROTOR

(71) Applicant: Magna Powertrain Inc., Concord (CA)

(72) Inventors: Richard Muizelaar, Mississauga (CA); Darrell F. Greene, Bradford (CA)

(73) Assignee: MAGNA POWERTRAIN INC., Concord (CA)

( * ) Notice: Subject to any disclaimer, the term of this patent is extended or adjusted under 35 U.S.C. 154(b) by 83 days.

(21) Appl. No.: 15/080,098

(22) Filed: Mar. 24, 2016

(65) Prior Publication Data

US 2016/0281585 A1 Sep. 29, 2016

Related U.S. Application Data

(60) Provisional application No. 62/138,146, filed on Mar. 25, 2015.

(51) Int. Cl.
| | |
|---|---|
| *F01L 7/00* | (2006.01) |
| *F01P 7/14* | (2006.01) |
| *F16K 11/085* | (2006.01) |
| *F16K 11/16* | (2006.01) |
| *F16K 31/00* | (2006.01) |
| *F16K 11/07* | (2006.01) |
| *F16K 31/04* | (2006.01) |

(52) U.S. Cl.
CPC ............ *F01P 7/14* (2013.01); *F16K 11/0716* (2013.01); *F16K 11/085* (2013.01);
(Continued)

(58) Field of Classification Search
CPC ..... F01P 7/14; F01P 2007/146; F16K 31/043; F16K 31/042; F16K 11/0716;
(Continued)

(56) References Cited

U.S. PATENT DOCUMENTS

| | | | |
|---|---|---|---|
| 3,989,058 A | * 11/1976 | Jackson | .................... F16K 3/26 137/269 |
| 4,751,900 A | 6/1988 | Ruffalo | |

(Continued)

FOREIGN PATENT DOCUMENTS

| | | |
|---|---|---|
| DE | 102006050826 A1 | 5/2008 |
| DE | 102009004157 B3 | 4/2010 |

(Continued)

OTHER PUBLICATIONS

European Search Report for European Application No. EP16161935.8, filed Mar. 23, 2016.

*Primary Examiner* — Hung Q Nguyen
(74) *Attorney, Agent, or Firm* — Warn Partners, P.C.

(57) ABSTRACT

A three part valve is provided. The valve has a housing having three axially spaced inlet ports and an outlet port. A rotary valve assembly with a modular rotor is provided for controlling fluid communication between the inlet ports and the outlet port. The rotary valve assembly includes a shaft. Additionally there is provided a first generally cylindrical valve module torsionally affixed with the shaft for controlling fluid communication between a first inlet port and the outlet port. The rotary valve assembly also includes a second generally cylindrical valve assembly rotatably mounted on the shaft controlling fluid communication between a second inlet port and the outlet port. The second valve module has a coupling interface with the first valve module. A third generally cylindrical valve module is also provided rotatably mounted on the shaft. The third cylindrical valve module controls fluid communication between a third inlet port and the outlet port. The third valve module has a coupling interface with the second valve module.

20 Claims, 4 Drawing Sheets

(52) U.S. Cl.
CPC .......... *F16K 11/165* (2013.01); *F16K 31/002* (2013.01); *F16K 31/042* (2013.01); *F16K 31/043* (2013.01); *F01P 2007/146* (2013.01)

(58) Field of Classification Search
CPC .... F16K 31/002; F16K 11/165; F16K 11/085; F16K 11/0856; F16K 11/087; F16K 11/0873; F16K 11/0876; Y10T 137/86622; Y10T 137/86638; Y10T 137/86646; Y10T 137/86654; Y10T 137/86662; Y10T 137/86871; Y10T 137/86879
USPC .............................. 251/207–208; 137/625.19, 137/625.21–625.24, 625.41
See application file for complete search history.

(56) References Cited

U.S. PATENT DOCUMENTS

| | | | |
|---|---|---|---|
| 4,821,692 A | 4/1989 | Browne | |
| 5,931,196 A * | 8/1999 | Bernardi | F16K 11/0856 137/625.46 |
| 6,240,941 B1 * | 6/2001 | Small | F16K 27/003 137/1 |
| 6,308,739 B1 * | 10/2001 | Barbuto | F16K 5/0478 137/625.11 |
| 6,470,913 B1 * | 10/2002 | Woodworth | F15B 13/0406 137/625.23 |
| 8,408,237 B2 | 4/2013 | Tejada et al. | |
| 8,671,982 B2 * | 3/2014 | Stoermer | F16K 11/0856 123/41.1 |
| 8,776,829 B2 * | 7/2014 | Sugie | F16K 11/076 137/625.15 |
| 9,500,299 B2 * | 11/2016 | Morein | F16K 11/0876 |
| 2006/0118066 A1 * | 6/2006 | Martins | F01P 7/165 123/41.08 |
| 2006/0174954 A1 * | 8/2006 | Hasko | F02G 1/043 137/625.16 |
| 2011/0168012 A1 * | 7/2011 | Reust | F16K 11/0716 91/363 R |
| 2012/0160192 A1 | 6/2012 | Magnier-Cathenod et al. | |
| 2013/0048084 A1 | 2/2013 | Bartnick et al. | |

FOREIGN PATENT DOCUMENTS

| | | |
|---|---|---|
| DE | 102012022238 A1 | 5/2014 |
| WO | 2014184783 A1 | 11/2014 |

* cited by examiner

MULTIPORT VALVE WITH MODULAR ROTOR

CROSS-REFERENCE TO RELATED APPLICATIONS

This application claims the benefit of U.S. Provisional Application No. 62/138,146, filed Mar. 25, 2015.

FIELD OF THE INVENTION

The field of the present invention is that of multiple port valves. More particularly the field of the present invention relates to multiple port valves useful as automotive vehicle cooling system module valves.

BACKGROUND OF THE INVENTION

Many automotive vehicles have an engine cooling system having a water pump with an outlet the feeds coolant into an engine block. Heated coolant from the engine block is regulated by a thermostat and is delivered to a radiator. Heated coolant is also delivered to a heater coil.

The radiator has an outlet that delivers coolant to an inlet of the water pump inlet. Coolant leaving the heater core is also delivered to the water pump. To increase the thermal efficiency of the engine, many automotive vehicle cooling systems have a bypass that allows engine coolant to bypass the radiator or the heater coil and return back to the inlet of the water pump. To better control coolant delivered to the water pump by the bypass, radiator, and heater, many automotive coolant systems have a coolant system module valve.

Various vehicles have different cooling system requirements based upon engine size, vehicle weight and performance characteristics. It is desirable to have a cooling system module valve that can be easily modified to meet the cooling system control requirements various vehicles. It is also desirable to provide the cooling system module valve as described above which additionally allows the amount of coolant delivery to the radiator to be adjusted while keeping the maximum amount coolant flow possible to the heater coil.

SUMMARY OF THE INVENTION

To make manifest the above noted and other desires, a revelation of the present invention is brought forth. A preferred embodiment of the present invention provides a three part valve. The valve has a housing having three axially spaced inlet ports and an outlet port. A rotary valve assembly with a modular rotor is provided for controlling fluid communication between the inlet ports and the outlet port. The rotary valve assembly includes a shaft. Additionally there is provided a first generally cylindrical valve module torsionally affixed with the shaft for controlling fluid communication between a first inlet port and the outlet port. The rotary valve assembly also includes a second generally cylindrical valve assembly rotatably mounted on the shaft controlling fluid communication between a second inlet port and the outlet port. The second valve module has a coupling interface with the first valve module. A third generally cylindrical valve module is also provided rotatably mounted on the shaft. The third cylindrical valve module controls fluid communication between a third inlet port and the outlet port. The third valve module has a coupling interface with the second valve module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
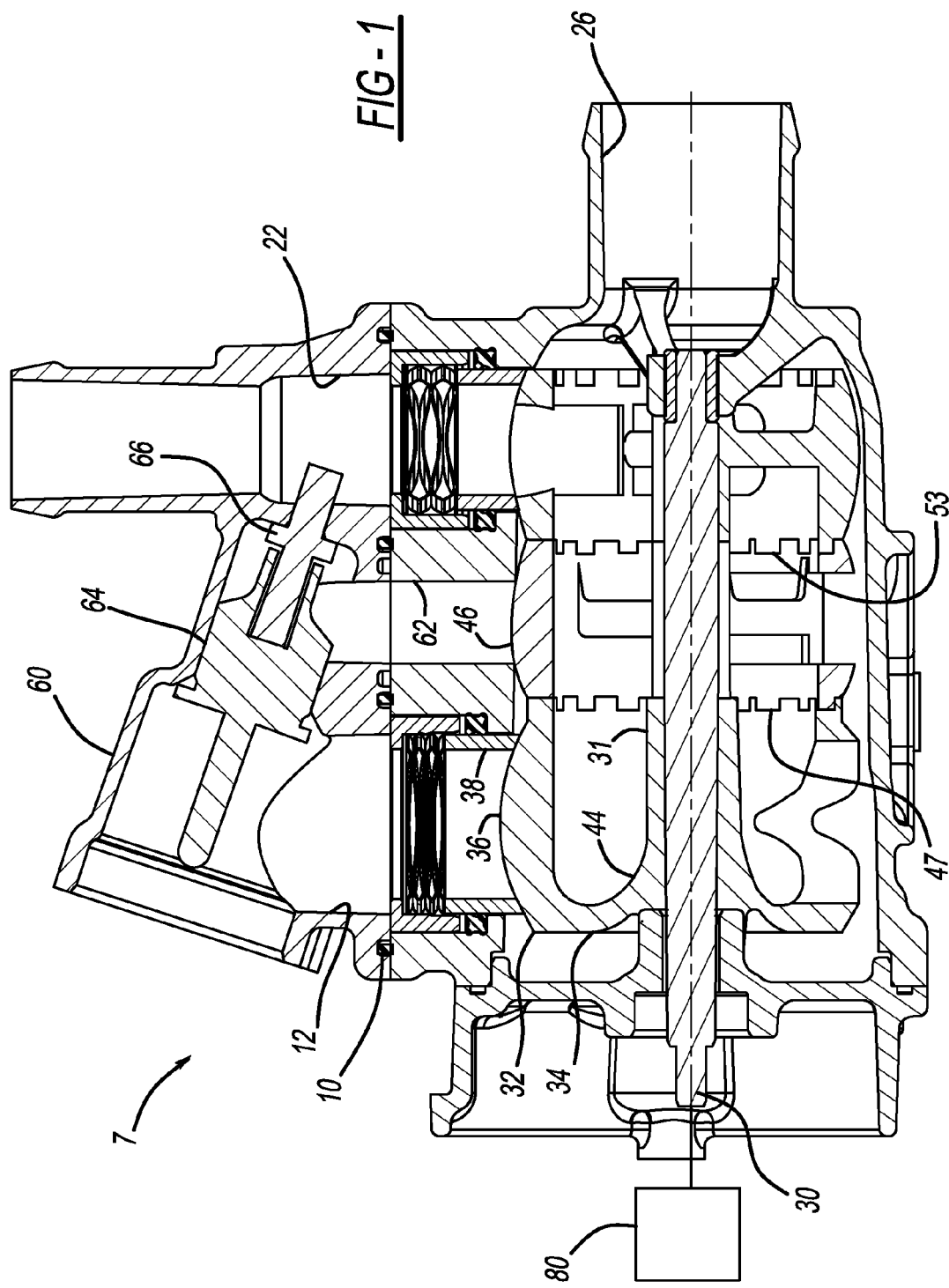
FIG. 1 is a sectional view of a preferred embodiment three port valve according to the present invention.
Figure 2:
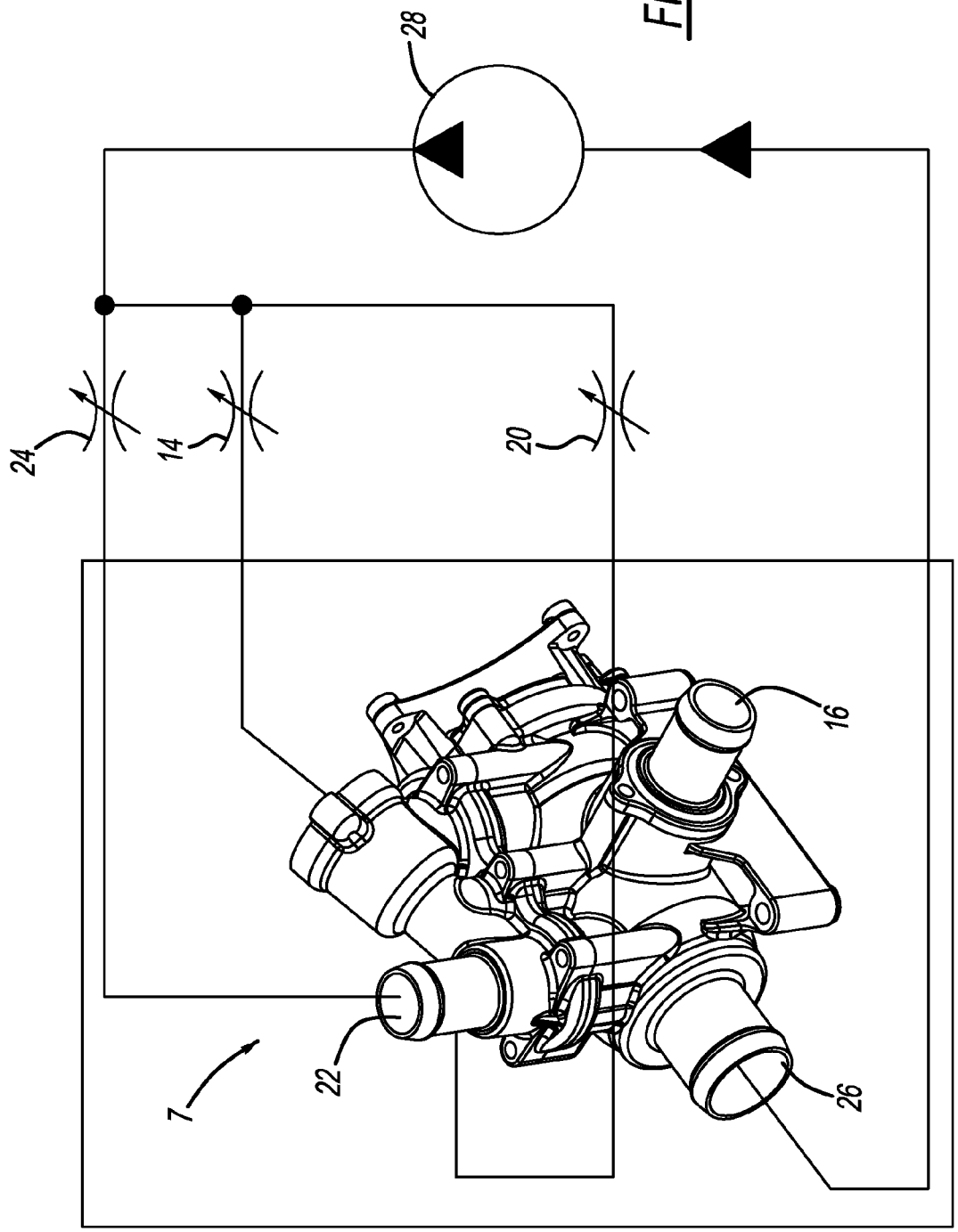
FIG. 2 is a perspective view of the valve shown in FIG. 1.
Figure 3:
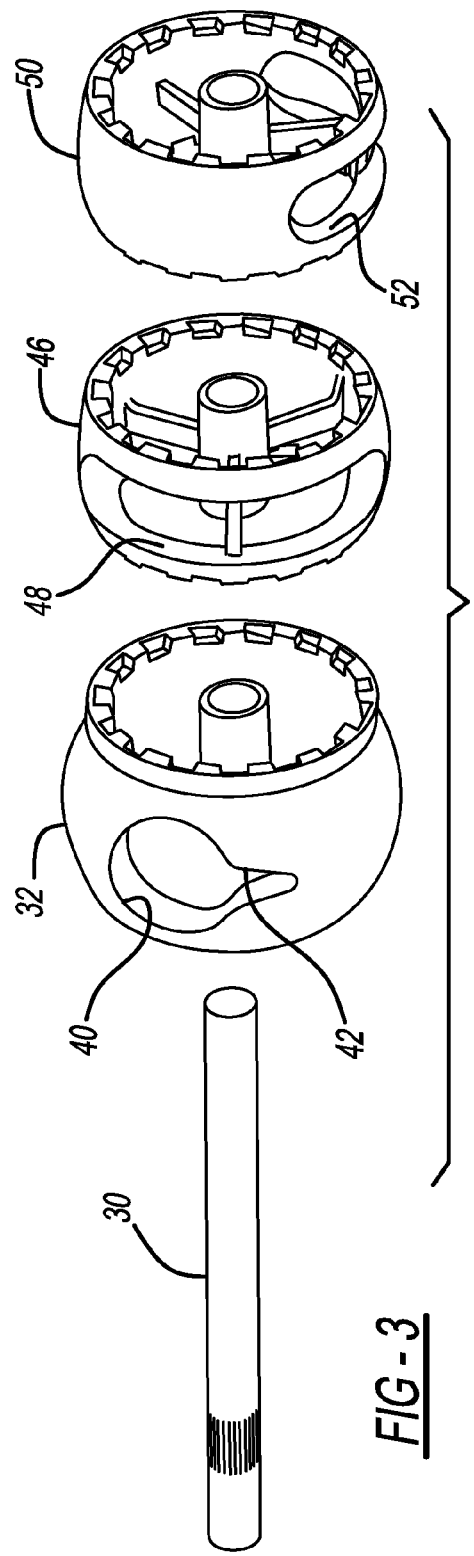
FIG. 3 is an exploded view illustrating a shaft first second and third valve modules utilize in the valve shown in FIGS. 1 and 2.

Referring to FIGS. 1-3, a three port valve 7 is provided. The valve 7 may function as an automotive vehicle engine cooling system module valve. The valve 7 has a multiple part housing 10. The housing 10 has three axially spaced inlet ports. A first inlet port 12 is fluidly connected with an outlet of a vehicle radiator 14. A second inlet port 16 is fluidly connected with an outlet of a heater 20. A third inlet port 22 is fluidly connected with an outlet of a cooling system bypass 24. An axial outlet port 26 of the housing 10 is fluidly connected with an inlet of a cooling system pump 28.

The three port valve 7 has a rotary valve assembly with a modular rotor. The rotary valve assembly includes a shaft 30. A first generally cylindrical valve module 32 is torsionally affixed with the shaft 30 along a rim portion 31. The first valve module 32 controls fluid communication between the inlet port 12 and the outlet port 26 by controlling flow between an external portion the first valve module 32 in an interior of the first valve module 32. The first valve module has a blind end 34. The first valve module 32 has a curvilinear axial cross sectional portion 36. The curvilinear portion 36 sealably mates with a spring biased cylindrical plunger 38. When rotated to an appropriate angle by the shaft 30, an aperture 40 with a lead in 42 allows fluid to flow from the inlet port 12 to an interior of the first valve module 32 and then exit out the outlet port 26. The first valve module is tapered along its interior 44 to improve fluid flow.

A second generally cylindrical valve module 46 is provided, rotatably mounted on the shaft 30. The second valve module has a curvilinear portion engaging with a spring biased cylindrical plunger (not shown in FIG. 1) in a manner similar to that explain the first valve module. The spring biased plunger for the second valve module being oriented at 90 degrees radially from the plunger 38. The second valve module 46 has a coupling interface 47 with the first valve module 32. In the embodiment shown in FIG. 1, the coupling interface 47 between the first valve module and the second valve module is a tooth and slot arrangement. The second valve module 46 has an aperture 48 allowing fluid to flow from an exterior of the second valve module to an interior of the second valve module. The above noted flow controls fluid communication from the second inlet port 16 to the outlet port 26. The second valve module aperture 48 is not radially aligned with the first valve module aperture 40, therefore flow rates (percentage of maximum flow rate) for the first and second inlet ports will not be necessarily equal to each other upon a given angular position of the shaft 30.

A third generally cylindrical valve module 50 is provided, rotatably mounted on the shaft 30. The third valve module 50 has a curvilinear portion engaging with a spring biased plunger in a manner similar to that explain the first valve module 32. The third valve module 50 has a coupling interface 53 with the second valve module 46 similar to the interface described between the first valve module 32 and the second valve module 46. The second valve module 50 has an aperture 52 allowing fluid to flow from an exterior of the third valve module to an interior of the third valve module. The above noted flow controls fluid communication from the third inlet port 22 to the outlet port 26. The third valve module aperture 50 is not necessarily radially aligned with the first valve module aperture 40 or the second valve module aperture 48, therefore flow rates (percentage of maximum flow rate) for the third and first inlet ports will not be necessarily equal to each other upon a given angular position of the shaft 30.

Different automotive vehicle applications will have different desired relationships between the flow rates allowed through the bypass 24, the radiator 14, and the heater 20. An advantage of the present invention is that different vehicle applications can have customized cooling system control modules by simply adjusting the angular position between the first and second valve modules or between the second and third valve modules as desired.

The three port valve 7 also has an over temperature safety system. The over temperature safety system is provided by a housing extension 60. Extension 60 connects an auxiliary port 62 with the radiator upstream of the first inlet port 12. Extension 60 mounts a valve body 64 which is spring biased to a close position by a spring (not shown). Valve body 64 is connected with a wax motor 66. Wax motor 66 extends into a conduit connecting with third inlet port 22 which is connected as previously mentioned with the bypass 24. If the valve body 10 is excessively heated by fluid flowing from the bypass the wax motor 66 will extend displacing valve body 64 allowing fluid from the radiator to enter into auxiliary port 62 thereby cooling the housing 10 and the first second and third valve modules before exiting the outlet port 26.

Figure 4:
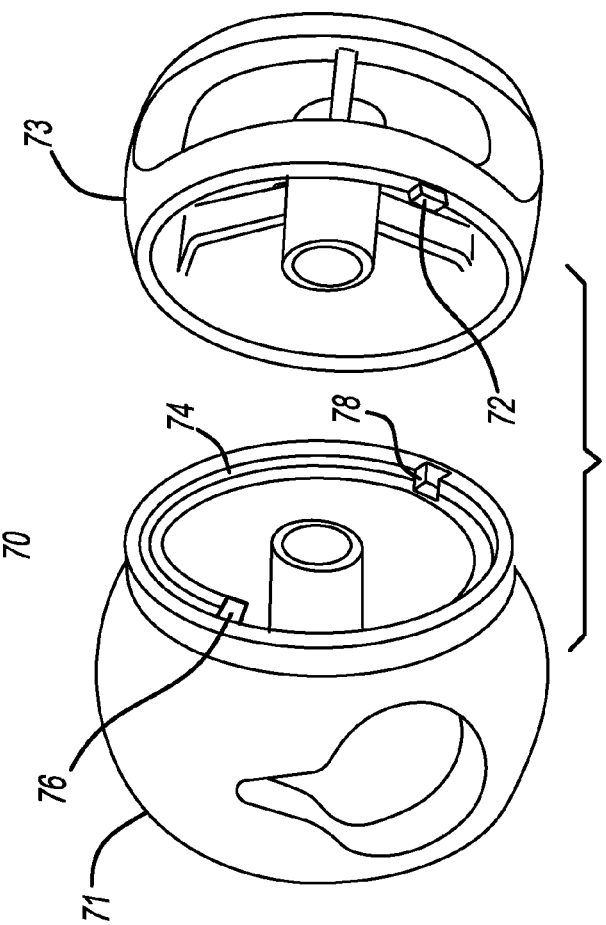
FIG. 4 is an exploded view of an alternate first and second valve modules utilized in the valve shown in FIGS. 1 and 2.
Figure 5:
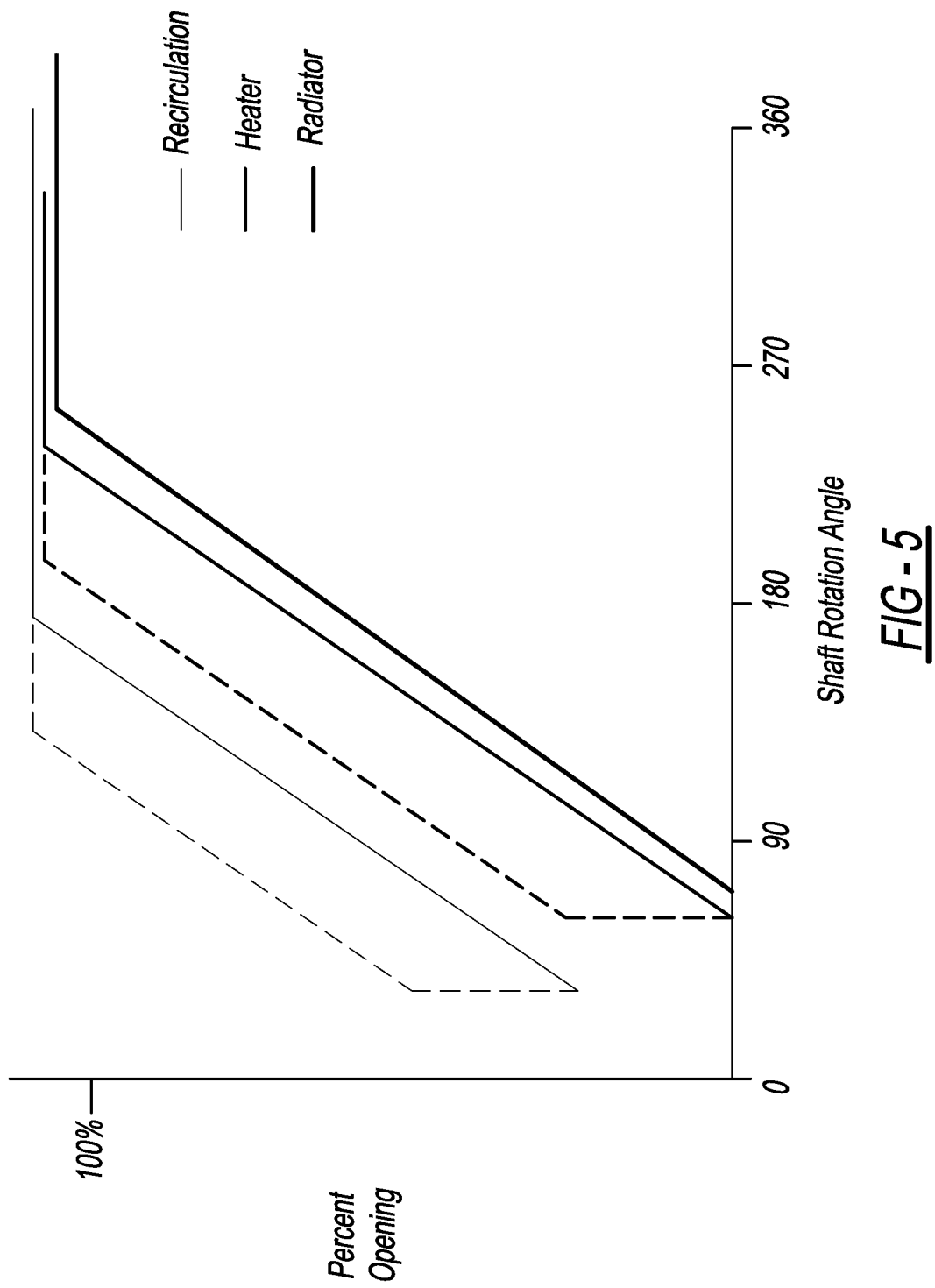
FIG. 5 is a chart illustrating percent opening versus shaft rotation of the valve shown FIG. 4.

Referring additionally to FIGS. 4 and 5, in the embodiment 70 there is a torsional lost motion in the coupling interface between the first valve module 71 and the second valve module 73. The torsional lost motion is provided by a tongue and groove type interface between the first valve module and the second valve module. This causes a hysteresis in the flow rate of the fluid delivered to the heater. A tongue 72 connected with the second valve module 46 slides in a groove 74 provided in the first valve module 32. The groove 74 has two blocks 76, 78 arcuately spaced apart. When the shaft 30 is at a zero degree position, block 78 is approximately 62 degrees from contact with the tongue 72. Therefore shaft 30 will rotate approximately 62 degrees from a zero position before the second valve module 46 is rotated by the block 78 making contact with the tongue 72. Further rotation of the shaft 30 will cause the radiator and heater to be adjusted to their maximum flow rates. Thereafter if the shaft 30 is reversed, the block 78 will move away from the tongue 72. The radiator 14 can have its flow rate lowered without lowering the flow rate to the heater. A downward adjustment of the radiator 14 flow rate can continue without lowering the flow rate to the heater, until the shaft has been reversed to the point that the block 76 contacts the tongue 72 (see point 95 in FIG. 5). After the block 76 contacts the tongue 74, both the radiator and heater are adjusted downward together. In a similar fashion a torsional lost motion connection can be provided for the coupling interface between the second and third valve modules if desired.

The shaft 30 is control by a motor 80 (shown schematically in FIG. 1) via a gearbox. Rotation of the shaft 30 by the motor 80 can be bidirectional. Rotation of the shaft 30 can by unidirectional with the return of the shaft being accomplished by a torsional spring. The motor 80 may be a stepper motor or a brushed DC motor. Simplistic electronic control, such as low side pulse width modulation is realized with a DC brush motor with a gearbox and being back drivable by a spring (this arrangement typically requires positioning sensing such as a potentiometer). When using a DC brush motor control can be done by an existing vehicle electronic control unit (ECU). If a stepper motor is utilized, position sensing may not be required, however more sophisticated electronics may be required (multiphase controller, multiprocessor, possibly an added ECU module). A failsafe mode for the motor is best realized by utilization of a torsional spring.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A three part valve comprising:
    a housing with three axially spaced inlet ports and an outlet port;
    a rotary valve assembly controlling fluid communication between said inlet ports and said outlet port;
    said rotary valve assembly including:
    a shaft;
    a first generally cylindrical valve module torsionally affixed with said shaft for controlling fluid communication between a first inlet port and said outlet port, said first valve module controlling flow from between an external portion of said first valve module and an interior of said valve module;
    a second generally cylindrical valve module rotatively mounted on said shaft for controlling fluid communication between a second inlet port and said outlet port, said second valve module controlling flow between an external portion of said second valve module and an interior of said second valve module, said second valve module having a coupling interface with said first valve module; and
    a third generally cylindrical valve module rotatively mounted on said shaft for controlling fluid communication between a third inlet port and said outlet port, said third valve module controlling flow between an external portion of said third valve module and an interior portion of said third valve module, said third valve module having a coupling interface with said second valve module.

2. The three port valve as described in claim 1 wherein said first valve module and said second valve module coupling interface has a torsional lost motion connection.

3. The three port valve as described in claim 1 wherein said second valve module and said third valve module coupling interface has a torsional lost motion connection.

4. The three port valve as described in claim 1 wherein said valve is a cooling module and said outlet port is connected to an inlet of a pump, said first inlet port is connected with a radiator, said second inlet port is connected with a heater, and said third inlet port is connected with a bypass.

5. The three port valve as described in claim 1 wherein said valve has an over temperature safety to allow flow from said first inlet port into said valve housing regardless of a position of said first valve module.

6. The three port valve as described in claim 5 wherein said over temperature safety is controlled by the temperature in said third inlet port.

7. The three port valve as described in claim 1 wherein said shaft is powered by a motor.

8. The three port valve as described in claim 7 wherein the motor has pulse width modulation.

9. The three port valve as described in claim 7 wherein the motor is a DC brush motor.

10. The three port valve as described in claim 7 wherein the motor is connected with said shaft via a gear box.

11. The three port valve as described in claim 7 wherein the motor is controlled by an engine control unit.

12. The three port valve as described in claim 7 wherein the motor is a step motor.

13. The three port valve as described in claim 7 wherein the motor is opposed by a spring.

14. A cooling module for an automotive vehicle comprising:
   a housing with three axially spaced inlet ports, a first inlet port being connected with a radiator outlet, a second inlet port being connected with a heater outlet, and a third inlet port connected with a radiator bypass outlet, and said housing having an outlet port connected to an inlet of a pump;
   a rotary valve assembly controlling fluid communication between said inlet ports and said outlet port;
   said rotary valve assembly including:
   a motorized shaft;
   a first generally cylindrical valve module torsionally affixed with said shaft for controlling fluid communication between said first inlet port and said housing outlet port, said first valve module controlling flow from between an external portion of said first valve module and an interior of said valve module;
   a second generally cylindrical valve module rotatively mounted on said shaft for controlling fluid communication between said second inlet port and said housing outlet port, said second valve module controlling flow between an external portion of said second valve module and an interior of said second valve module, said second valve module having a torsional lost motion coupling interface with said first valve module; and
   a third generally cylindrical valve module rotatively mounted on said shaft for controlling fluid communication between said third inlet and said housing outlet port, said third valve module controlling flow between an external portion of said third valve module and an interior portion of said third valve module, said third valve module having a torsional lost motion coupling interface with said second valve module.

15. The cooling module as described in claim 14 wherein said cooling module has an over temperature safety to allow flow from said first inlet port into said valve housing regardless of a position of said first valve module.

16. The cooling module as described in claim 14 wherein said over temperature safety is controlled by the temperature in said third inlet port.

17. The cooling module as described in claim 13 wherein said shaft is powered by a motor that is opposed by a spring.

18. The three port valve as described in claim 17 wherein the motor has pulse width modulation.

19. The three port valve as described in claim 17 wherein the motor is a DC brush motor.

20. A method of valving a radiator outlet, a heater outlet and a radiator bypass of an automotive vehicle comprising:
   providing a housing with a radiator inlet port, a heater inlet port, and a radiator bypass inlet port, and providing a housing outlet port connected to a pump inlet;
   providing a rotary valve assembly controlling fluid communication between said inlet ports and said outlet port;
   said rotary valve assembly providing:
   a powered shaft;
   a first generally cylindrical valve module torsionally affixed with said shaft controlling fluid communication between said radiator inlet port and said outlet port, said first valve module controlling flow from between an external portion of said first valve module and an interior of said valve module;
   a second generally cylindrical valve module rotatively mounted in said shaft controlling fluid communication between said heater inlet port and said outlet port, said second valve module controlling flow between an external portion of said second valve module and an interior of said second valve module, said second valve module having a torsional lost motion coupling interface with said first valve module; and
   a third generally cylindrical valve module rotatively mounted on said shaft controlling fluid communication between said radiator bypass inlet port and said outlet port, said third valve module controlling flow between an external portion of said third valve module and an interior portion of said third valve module, said third valve module having torsional lost motion coupling interface with said second valve module.

* * * * *